(12) United States Patent
Vos

(10) Patent No.: US 6,486,921 B1
(45) Date of Patent: Nov. 26, 2002

(54) METHOD AND CIRCUIT FOR FORMING ON-SCREEN DISPLAYS FOR OVERLAY ON A VIDEO IMAGE

(75) Inventor: Mark Vos, Grenoble (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/415,424

(22) Filed: Oct. 8, 1999

(30) Foreign Application Priority Data

Oct. 9, 1998 (FR) .............................................. 98 12693

(51) Int. Cl.[7] ........................... H04N 5/50; H04N 5/445
(52) U.S. Cl. ....................................... 348/569; 348/567
(58) Field of Search ................................ 348/569, 563, 348/564, 567, 586, 589, 598, 600; H04N 5/50, 5/445, 9/74, 9/76

(56) References Cited

U.S. PATENT DOCUMENTS

| | | | |
|---|---|---|---|
| 5,510,843 A | 4/1996 | Keene et al. | |
| 5,638,112 A | 6/1997 | Bestler et al. | |
| 5,640,502 A | 6/1997 | Knox et al. | |
| 5,742,349 A | 4/1998 | Choi et al. | |
| 6,327,003 B1 * | 12/2001 | Vos | ............................ 348/569 |

FOREIGN PATENT DOCUMENTS

| | | |
|---|---|---|
| EP | 0762331 A2 | 3/1997 |
| GB | 2292294 A | 2/1996 |
| WO | WO98/17056 | 4/1998 |
| WO | WO98/17058 | 4/1998 |
| WO | WO98/17066 | 4/1998 |

OTHER PUBLICATIONS

French Search Report dated May 27, 1999 with annex to French application No. 98/12693.

* cited by examiner

*Primary Examiner*—Sherrie Hsia
(74) *Attorney, Agent, or Firm*—Lisa K. Jorgenson; Stephen Bongini; Fleit, Kain, Gibbons, Gutman & Bongini P.L.

(57) ABSTRACT

A method is provided for displaying an OSD on a video image. According to the method, values of pixels of the OSD are stored, and pixels of lines of the OSD that are to be displayed without processing are displayed by making direct use of a color look-up table. Additionally, pixels of lines of the OSD that are to be displayed after processing with a mathematical filter and/or that are required for computations associated with the mathematical filter are processed. In the processing step, the pixels of the lines to be processed are stored in the form of addresses that designate the memory lines of the color look-up table, the values of the pixels of the lines to be processed are obtained by an addressing of the color look-up table, and a mathematical filter is applied to the obtained values of the pixels to be processed. In a preferred embodiment, for the pixels of each line being processed, the addresses designating the memory lines of the color look-up table are distributed between a master unit and a slave unit. This provides a gain in memory space because the values conventionally used to define each pixel do not have to be stored. An increased processing speed is also obtained. A device for displaying an OSD on a video image is also provided.

19 Claims, 2 Drawing Sheets

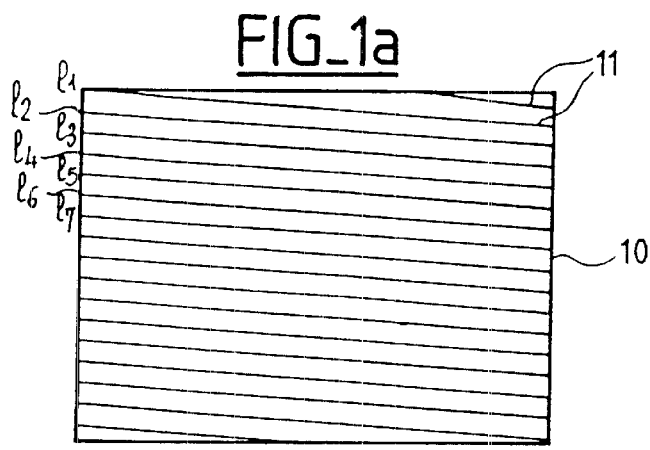
FIG_1a
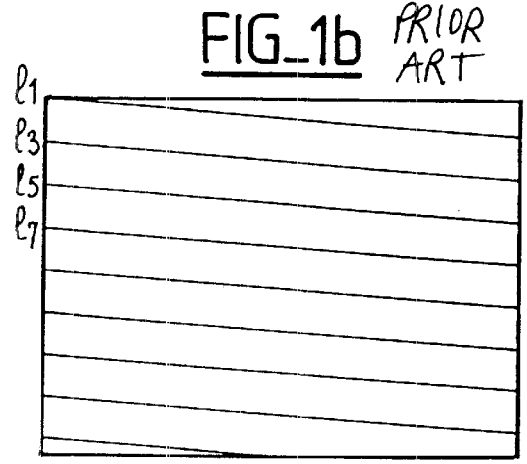
FIG_1b PRIOR ART
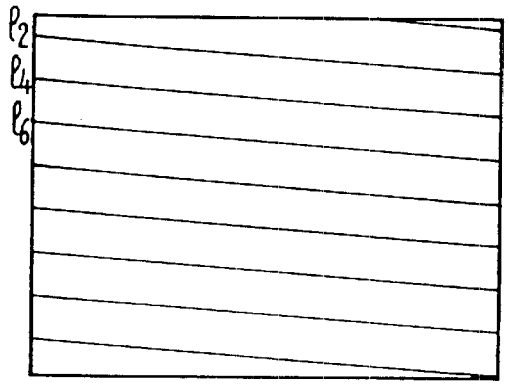
FIG_1c PRIOR ART
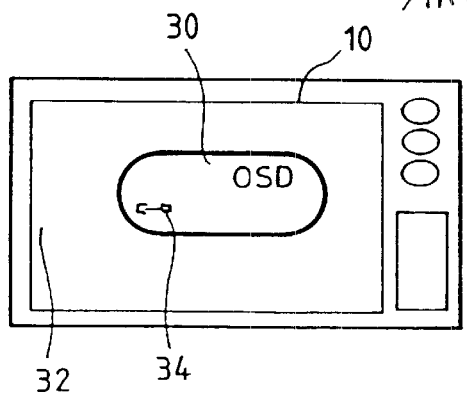
FIG_3a PRIOR ART
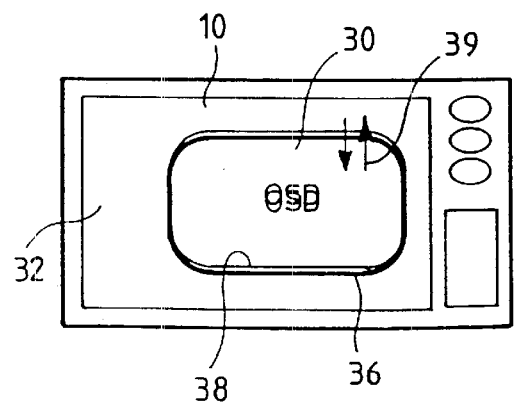
FIG_3b PRIOR ART

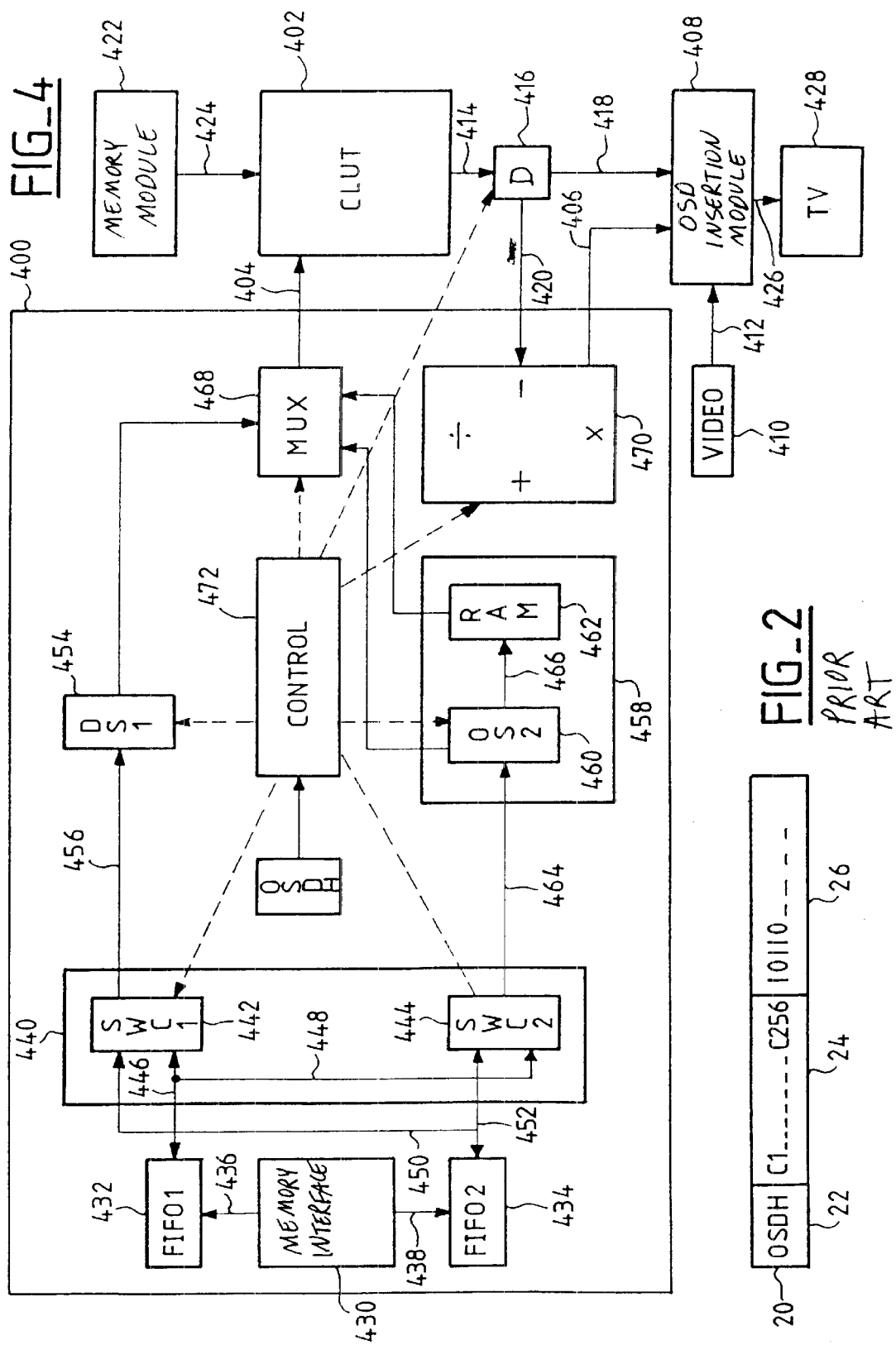

METHOD AND CIRCUIT FOR FORMING ON-SCREEN DISPLAYS FOR OVERLAY ON A VIDEO IMAGE

CROSS-REFERENCE TO RELATED APPLICATIONS

This application is based upon and claims priority from prior French Patent Application No. 98-12693, filed Oct. 9, 1998, the entire disclosure of which is herein incorporated by reference.

BACKGROUND OF THE INVENTION

1. Field of the Invention

The present invention relates to displays, and more specifically to a method and circuit for forming high quality on-screen displays for overlay on a video image with economical memory space requirements.

2. Description of Related Art

A video image is formed by a sequence of lines of pixels. The pixels are elementary picture elements. In color television systems, each pixel is a carrier of luminance information and chrominance information that makes it possible to specify the luminosity and color of each image point. In the most commonly used television systems, the image develops according to a principle of horizontal scanning of the screen. Whether it is the NTSC television system, the PAL television system, or the SECAM television system, each image displayed results from the alternating display of two distinct partial images known as frames. In general, there is a first frame, which is known as an odd-parity frame, and a second frame which is known as an even-parity frame.

FIG. 1a shows a television screen 10 with a view of a set of lines 11 of the displayed image. The lines, which are numbered as 11, 12, 13, and so on, are formed by a succession of pixels. The visible image on the television screen 10 of FIG. 1a corresponds to the interlacing of two partial images. In particular, FIG. 1b shows a first partial image that consists of the odd-parity lines of the final image, and FIG. 1c shows a second partial image that consists of the even-parity lines of the final image. The first partial image corresponds to the odd-parity frame of the image, and the second partial image corresponds to the even-parity frame of the image.

The number of lines displayed during the depiction of a video image depends on the television system used. For example, the NTSC television system has images formed by 480 video lines that are almost horizontal. This corresponds to the interlacing of an odd-parity frame and an even-parity frame of 240 lines each. In all of the television systems referred to above, the refreshing frequency of the video image is half of the refreshing frequency of the frame. For example, in the NTSC television system, an entire new image appears every 1/30 seconds (which corresponds to a refresh frequency of 30 Hz) whereas a new frame (alternately the odd-parity frame and the even-parity frame) is refreshed every 1/60 seconds (which corresponds to a refresh frequency of 60 Hz). In the PAL and SECAM television systems, the refresh frequency of the entire image is 25 Hz.

The very nature of television images (i.e., the interlacing of two partial images) gives rise to problems of image quality and flicker. In an extreme case, a line of black pixels on a white image background gives the human eye the unpleasant impression of appearing and disappearing, especially if this line is observed from a close distance. Furthermore, it is increasingly common to present on-screen displays (OSDs) that are overlaid on video images. Each pixel of an OSD is characterized by three values Y, U, and V that determine luminosity and color and a value MW for transparency. For example, OSDs are commonly used to provide a permanent or non-permanent indication of the progress of a sporting event, such as the score of a match. OSDs are also used by certain television channels to show their logo so as to indicate to the viewer the television channel that is being watched.

FIG. 2 shows a conventional structure for the code of an OSD. A binary train 20 containing the codes needed to display an OSD typically consists of three sets of bits that have different functions. A first set of bits 22 forms the OSD header. The OSD header 22 has information on the number of bits needed to define a pixel, and information on the coordinates of certain characteristic points of the OSD. A second set of bits 24 is used to define the panel of colors that will be used during the display of the OSD. All of the colors that will be used are stored in a memory known as a color look-up table (CLUT). Generally, the CLUT is limited to 256 memory lines, with each memory line containing the values of the bits corresponding to a color programmed in a table through the second set of bits 24. Additionally, a third set of bits 26 is formed by the addresses of the memory lines of the table of the available colors containing the appropriate color for each pixel of the OSD.

While flicker problems exist, in purely analog television pictures they are small as compared with the flicker phenomena that can appear when digital on-screen displays are presented on a video image background. In particular, for a standard analog television signal, the resolution and the contrast between lines are relatively low. Regardless, the refresh frequency of the image under the different analog television systems is acceptable for the human eye. At an average distance for the viewer, the flicker phenomenon is not perceivable. Further, in video pictures without overlay, an attenuation of contrasts is performed automatically due to the use of a camera in creating the image because commonly used cameras cannot reliably render the transitions between colors that are far distant from each other in the spectrum of visible frequencies. Thus, inappropriate colors appear randomly at the transitions between certain colors. This phenomenon is known as aliasing.

On the other hand, major contrasts may appear between two consecutive lines when digital on-screen displays are overlaid on the video image. Further, when an OSD is created, the background of the video image on which the OSD will be displayed is not generally known. Thus, in extreme cases, a blue OSD may be displayed when the background of the video image is red. Additionally, nothing prevents the designer of an OSD from juxtaposing two lines with high contrast with respect to each other in the OSD itself. The automatic attenuation of contrasts does not arise during the creation of an OSD because of the absence of the camera in the image generation cycle. Two patterns of distant colors in the spectrum of visible frequencies may be juxtaposed.

FIGS. 3a and 3b illustrate problems that can be encountered during the display of an OSD on a video image background. FIG. 3a shows a television screen that is displaying an OSD 30 on a video image background 32. The OSD 30 shows a zone with a white background from which there emerges a thin black line with the width of a pixel. This is typically the case where the flicker effect is the most visible. Due to the interlacing of the even-parity and odd-parity frames, the thin black line 34 appears and disappears at a speed that is low enough for this phenomenon to be detected by the human eye.

FIG. 3b shows another problem related to the display of an OSD on a video image background. On the background of a video image 32, an OSD 30 is formed by a first pattern 36 that is displayed with the even-parity frame and a second pattern 38 that is displayed with the odd-parity frame. This gives an impression of flutter 39. More specifically, the OSD seems to rise and fall the amplitude of a pixel at a rate dictated by the refresh frequency of the frames of the image. This flutter problem has the same cause as the flicker problem. The phenomenon of flutter appears when the same image is displayed by the even-parity frame and by the odd-parity frame. Depending on the television system used, the even-parity frame appears every ¹⁄₂₅ seconds or every ¹⁄₃₀ seconds in alternation with the odd-parity frame. The human eye detects a flutter motion due to the appearance of the OSD alternately on one set of lines and then on the set of directly neighboring lines.

These phenomena of flicker and flutter are mainly perceived when long horizontal lines are displayed on the screen, which is frequent in OSDs. There are several conventional approaches to overcoming these problems of vertical transition in the definition of an image having one or more OSDs. For example, it is possible to act on the transparency of each pixel of an OSD. To avoid sudden transitions of color, it is possible to apply mathematical filters that use the values of neighboring pixels and weighting to compute new values of these pixels. Furthermore, there are circuits that automatically detect excessive color contrasts between successive lines. These circuits then automatically carry out the weighting operations associated with the appropriate mathematical filter.

To apply mathematical filters to the pixels, it is necessary to keep the data needed by the computations for the mathematical filter in memory. For each pixel implicated in computations for a mathematical filter, it is often necessary to store in memory the data bits that correspond to the values of that pixel (i.e., typically 30 bits: 8 bits for each value Y, U, and V for the luminosity and color, and 6 bits for the transparency. This type of approach creates a drawback in that a substantial memory space is required, especially with typical mathematical filters that are applied to large-sized horizontal segments. Furthermore, the memories used in such applications typically must be small capacity memories.

SUMMARY OF THE INVENTION

In view of these drawbacks, it is an object of the present invention to overcome the above-mentioned drawbacks and to provide a method for displaying high quality OSDs on a video image. The method improves the quality of the vertical transitions within the OSDs themselves and at the horizontal boundaries between the OSD and the video image by bringing into play the table of colors available during the implementation of a mathematical filters and taking pixels of the adjacent lines into consideration.

One embodiment of the present invention provides a method for displaying an OSD on a video image. According to the method, values of pixels of the OSD are stored, and pixels of lines of the OSD that are to be displayed without processing are displayed by making direct use of a color look-up table. Additionally, pixels of lines of the OSD that are to be displayed after processing with a mathematical filter and/or that are required for computations associated with the mathematical filter are processed. In the processing step, the pixels of the lines to be processed are stored in the form of addresses that designate the memory lines of the color look-up table, the values of the pixels of the lines to be processed are obtained by an addressing of the color look-up table, and a mathematical filter is applied to the obtained values of the pixels to be processed. In a preferred embodiment, for the pixels of each line being processed, the addresses designating the memory lines of the color look-up table are distributed between a master unit and a slave unit.

Another embodiment of the present invention provides a device for displaying an OSD on a video image. The device includes a processing interface, a first memory module, a color look-up table capable of being addressed by both the processing interface and the first memory module, an OSD insertion module, and a control unit. For each pixel, the control unit selectively sends data elements from the color look-up table to either the processing interface or the OSD insertion module. In one preferred embodiment, the device also includes a logic unit that sends the data elements from the color look-up table to either the processing interface or the OSD insertion module based on a control signal from the control unit.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIGS. 1a, 1b, and 1c show a television screen displaying all the lines of a video image, the lines of the odd-parity frame, and the lines of the even-parity frame, respectively;

FIG. 2 shows a conventional structure for the code of an OSD;

FIGS. 3a and 3b respectively illustrate the problems of flicker and flutter during the display of an OSD on a video image background; and FIG. 4 is a block diagram of a preferred embodiment of a circuit for implementing the method of the present invention.

DETAILED DESCRIPTION OF PREFERRED EMBODIMENTS

Preferred embodiments of the present invention will be described in detail hereinbelow with reference to the attached drawings.

FIG. 4 shows a circuit according to a preferred embodiment of the present invention. As shown, a processing interface 400 is connected to a color look-up table 402 by a first data bus 404. A second data bus 406 provides connection between the processing interface 400 and an OSD insertion module 408. A video signal 410 is supplied to the OSD insertion module 408 by a first link 412. A third data bus 414 provides connection between the color look-up table 402 and a logic unit 416. A fourth data bus 418 and a fifth data bus 420 provide connection between the logic unit 416 and the OSD insertion module 408 and processing interface 400, respectively. A first memory module 422 is connected to the color look-up table 402 by a sixth data bus 424. Further, a second link 426 enables the exchange of information between the OSD insertion module 408 and a television receiver 428.

The processing interface 400 includes a memory interface, a decision unit, master and slave units, a multiplexer, a computation unit, and a control unit. The memory interface 430 is connected to a first FIFO-type register 432 and a second FIFO-type register 434 by a seventh data bus 436 and an eighth data bus 438, respectively. The decision unit 440 includes a first connector 442 and a second connector 444. The first FIFO-type register 432 is connected to the first connector 442 and the second connector 444 by a ninth data bus 446 and a tenth data bus 448, respectively. The second FIFO-type register 434 is connected to the first connector 442 and the second connector 444 by an eleventh data bus 450 and a twelfth data bus 452, respectively.

The master unit includes a first data separation register 454 and is connected to the first connector 442 by a thirteenth data bus 456, and a slave unit 458 has a second data separating register 460 and a RAM-type memory 462. A fourteenth data bus 464 connections the second connector 444 and the second data separation register 460, and a fifteenth data bus 466 connects the second data separating register 460 and the RAM type memory 462. The multiplexer 468 receives a first signal from the first data separating register 454, a second signal from the second data separating register 460, and a third signal from the RAM-type memory 462. The output of the multiplexer is provided to the first data bus 404.

Additionally, the computation unit 470 receives the information elements conveyed by the fifth data bus 420 and outputs information that is conveyed by the second data bus 406. The control unit 472 (which in further embodiments is external to the processing interface) controls the operations of the first connector 442, the second connector 444, the first data separating register 454, the second data separating register 460, the multiplexer 468, the computation unit 470, and the logic unit 416. The control unit 472 uses the information contained in the header OSDH of each processed OSD.

The operation of the circuit of FIG. 4 in accordance with a preferred embodiment of the present invention will now be explained. When an OSD is programmed, part of the OSD code corresponding to the header of the OSD is made available to the control unit 472. The second part of the code of the OSD that corresponds to the definition of the colors that form the OSD is stored in the color look-up table 402. The third part of the code of the OSD, which is formed by addresses designating the memory lines of the color look-up table, is divided into two groups. First, the data elements relative to the pixels of lines that do not have to be processed and that come into play in each processing operation are stored in the first memory module 422. Second, the data elements relating to the pixels of lines that have to be processed or that come into play in a processing operation are managed by the processing interface 400 and stored in a memory interface 430.

To simplify the following explanation of the operation of the processing interface, a precise example is considered. However, the present invention can also be applied to more complex cases so the scope of the present invention is not meant to be limited by the described example. During operation, a row of pixels of the OSD must be processed. For this explanation, it is assumed that the processing being used requires a knowledge of the two lines of pixels that are directly adjacent to the line being processed. That is, if it is sought to process a line of pixels N of the odd-parity frame of the image, it is necessary to know the lines of pixels N−1 and N of the even-parity frame of the image. Generally, the line of pixels being processed is known as the master line, and the other lines of pixels that come into play in the different computations are known as slave lines.

The memory interface 430 distributes the data elements of the stored lines between the first FIFO-type register 432 (e.g., for the groups of stored pixels belong to the odd-parity frame) and the second FIFO-type register 434 (e.g., for the groups of stored pixels belong to the even-parity frame). The first and second connectors 442 and 444 enable the transmission of the data elements of the pixels of the master line to the first data separating register 454 and the pixels of the slave lines to the slave unit 458. Thus, for each pixel belonging to a line of the OSD undergoing a processing operation, the addresses designating the memory lines of the color look-up table associated with each processed pixel are distributed between the master unit 454 for the pixels of the line of the OSD and the slave unit 458 for the other pixels coming into play in the computations dictated by the mathematical filter. (Generally, a line of the OSD corresponds to a portion of a line of the screen.)

When there is more than one line of slave pixels as in this exemplary case, the data elements pertaining to the pixels of the additional slave lines are stored in a memory (preferably a random access-type memory) such as the RAM 462. Thus, when a line of pixels of the OSD of a first frame is processed, the addresses designating the memory lines of the color look-up table for each pixel that does not belong to the corresponding video line of the second frame and that comes into play in the processing computations are stored in a memory 462.

In particular, for each pixel, the information elements stored are the addresses designating an appropriate line of the color look-up table. Thus, in accordance with the present invention, for each pixel coming into play in the processing interface, only the addresses designating the appropriate memory lines of the color look-up table are stored. This results in a substantial gain of memory space. For example, six address bits often suffice to subsequently retrieve the values of a pixel, whereas the conventional method described above typically required thirty data bits.

The data separating registers send groups of data elements of appropriate the size to the multiplexer or to the memory slots of the RAM 462. Thus, if an OSD has only eight colors, only 3 bits are needed to designate each memory line of the color look-up table. The header of each OSD provides the information that the control unit 472 requires to perform these appropriate subdivisions. Further, depending on the mathematical filter used by the computation unit 470, the control unit 472 acts on the multiplexer whose output is used to address the color look-up table. In particular, the multiplexer outputs either the address from the first data separating register, the address from the second data separating register 460, or the addresses contained in the RAM 462.

The designated memory line of the color look-up table sends the characteristic values of each pixel implicated in the computation related to the filter to the logic unit 416 through the third data bus 414. The logic unit 416 is also controlled by the control unit 472. If the data elements from the color look-up table 402 are supplied after an addressing by the processing interface 400, the data elements from the color look-up table are conveyed by the fifth data bus 420 to the computation unit 470. Otherwise, the data elements from the color look-up table are conveyed by the fourth data bus 418 to the OSD insertion module 408.

This routing of data elements is done by the control unit 472. In other words, for each pixel, the logic unit 416 sends the data elements from the color look-up table to either the processing interface 400 or the OSD insertion module 408 depending on a control coming from a control unit 472. The control unit 472 also controls the operations of the computation unit 470. Once the computations have been performed by the computation unit 470, the new characteristic values of the processed pixels are conveyed by the second data bus 406 to the OSD insertion module 408. The video signal 410 is supplied to the OSD insertion module 408, and the OSD insertion module 408 inserts the lines of each OSD into the video image. The final image is then transmitted (e.g., by a wired link or an RF link) to a television receiver 428.

In general, if pixels belonging to more than three lines of the OSD are implicated in the processing computations for improving the quality of the OSD vertical transitions, the data elements of the pixels belonging to the additional lines are also stored in the slave unit 458 in the form of addresses designating the memory line in the color look-up table for each pixel. More specifically, for a line of an OSD belonging to a first frame to be processed, the data elements of the pixels that do not belong to the corresponding line of the second frame and that come into play in the processing computations are stored in the memory 462 (e.g., a RAM-type memory).

In any case, only the addresses designating the appropriate memory lines of the color look-up table are stored in the processing unit. Thus, the present invention provides a considerable gain in available memory space. Furthermore, fewer bits have to be conveyed by the data busses during a first part of the processing, and thus accelerated processing is provided. Accordingly, a greater number of pixels may take part more rapidly in computations designed to improve the vertical transitions in images having OSDs.

As described above, in accordance with the present invention, the color look-up table, which is programmed beforehand for each OSD, is used so that the data bits that correspond to the values of each pixel no longer have to be physically stored. Instead, only the addresses of the color look-up table containing the information elements on each pixel are stored. Thus, for a color look-up table having 256 memory lines, 8 address bits are sufficient to designate each of the memory lines. As a result, for each pixel that comes into play in the weighting computations required by the mathematical filters being used, only eight address bits must be stored in the memory. The present invention can is particularly suited for use with methods for improving vertical transitions involving OSDs, especially when the mathematical filters used in such methods use three consecutive lines of pixels.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for displaying an OSD on a video image, said method comprising the steps of:

storing values of pixels of the OSD;

displaying pixels of lines of the OSD that are to be displayed without processing by making direct use of a color look-up table; and processing pixels of lines of the OSD that are to be displayed after processing with a mathematical filter and/or that are required for computations associated with the mathematical filter, wherein the processing step includes the sub-steps of:
    storing the pixels of the lines to be processed in the form of addresses that designate the memory lines of the color look-up table;
    obtaining the values of the pixels of the lines to be processed by an addressing of the color look-up table; and
    applying a mathematical filter to the obtained values of the pixels to be processed.

2. The method as defined in claim 1, wherein the processing step also includes the sub-step of:
    for the pixels of each line being processed, distributing the addresses designating the memory lines of the color look-up table between a master unit for the pixels of the line that is being processed and a slave unit for the other pixels that enter into the computations associated with the mathematical filter.

3. The method as defined in claim 2, wherein the processing step also includes the sub-step of:
    when a line of pixels of the OSD for a first frame is processed, storing the addresses designating the memory lines of the color look-up table for each pixel not belonging to the corresponding video line of the second frame and entering into the computations in a second memory.

4. The method as defined in claim 3, wherein the second memory is a random access memory.

5. The method as defined in claim 1, wherein each of the memory lines of the color look-up table contains characteristic values of the pixels of the OSD.

6. The method as defined in claim 1, further comprising the step of programming values for each pixel of the OSD.

7. A machine-readable medium encoded with a program for displaying an OSD on a video image, said program containing instructions for performing the steps of:

storing values of pixels of the OSD;

displaying pixels of lines of the OSD that are to be displayed without processing by making direct use of a color look-up table; and processing pixels of lines of the OSD that are to be displayed after processing with a mathematical filter and/or that are required for computations associated with the mathematical filter, wherein the processing step includes the sub-steps of:
    storing the pixels of the lines to be processed in the form of addresses that designate the memory lines of the color look-up table;
    obtaining the values of the pixels of the lines to be processed by an addressing of the color look-up table; and
    applying a mathematical filter to the obtained values of the pixels to be processed.

8. The machine-readable medium as defined in claim 7, wherein the processing step also includes the sub-step of:
    for the pixels of each line being processed, distributing the addresses designating the memory lines of the color look-up table between a master unit for the pixels of the line that is being processed and a slave unit for the other pixels that enter into the computations associated with the mathematical filter.

9. The machine-readable medium as defined in claim 8, wherein the processing step also includes the sub-step of:

when a line of pixels of the OSD for a first frame is processed, storing the addresses designating the memory lines of the color look-up table for each pixel not belonging to the corresponding video line of the second frame and entering into the computations in a second memory.

10. The machine-readable medium as defined in claim 9, wherein the second memory is a random access memory.

11. The machine-readable medium as defined in claim 7, wherein each of the memory lines of the color look-up table contains characteristic values of the pixels of the OSD.

12. The machine-readable medium as defined in claim 7, wherein said program further contains instructions for performing the step of programming values for each pixel of the OSD.

13. A device for displaying an OSD on a video image, said device comprising:

a processing interface;

a first memory module;

a color look-up table capable of being addressed by both the processing interface and the first memory module;

an OSD insertion module; and a control unit that, for each pixel, selectively sends data elements from the color look-up table to either the processing interface or the OSD insertion module.

14. The device as defined in claim 13, further comprising:

a logic unit coupled to both the color look-up table and the OSD insertion module, wherein the logic unit sends the data elements from the color look-up table to either the processing interface or the OSD insertion module based on a control signal from the control unit.

15. The device as defined in claim 13, wherein for data elements from the color look-up table that are supplied after an addressing by the processing interface, the data elements are sent to the processing interface, and other data elements from the color look-up table are sent to the OSD insertion module.

16. A device for displaying an OSD on a video image, said device comprising:

storage for storing values of pixels of the OSD;

means for displaying pixels of lines of the OSD that are to be displayed without processing by making direct use of a color look-up table; and means for processing pixels of lines of the OSD that are to be displayed after processing with a mathematical filter and/or that are required for computations associated with the mathematical filter, wherein the means for processing includes:

means for storing the pixels of the lines to be processed in the form of addresses that designate the memory lines of the color look-up table;

means for obtaining the values of the pixels of the lines to be processed by an addressing of the color look-up table; and means for applying a mathematical filter to the obtained values of the pixels to be processed.

17. The device as defined in claim 16, wherein the means for processing also includes means for distributing the addresses designating the memory lines of the color look-up table between a master unit for the pixels of the line that is being processed and a slave unit for the other pixels that enter into the computations associated with the mathematical filter, for the pixels of each line being processed.

18. The device as defined in claim 17, wherein the means for processing also includes means for storing the addresses designating the memory lines of the color look-up table for each pixel not belonging to the corresponding video line of the second frame and entering into the computations in a second memory, when a line of pixels of the OSD for a first frame is processed.

19. The device as defined in claim 16, wherein each of the memory lines of the color look-up table contains characteristic values of the pixels of the OSD.

* * * * *